United States Patent Office 3,225,730
Patented Dec. 28, 1965

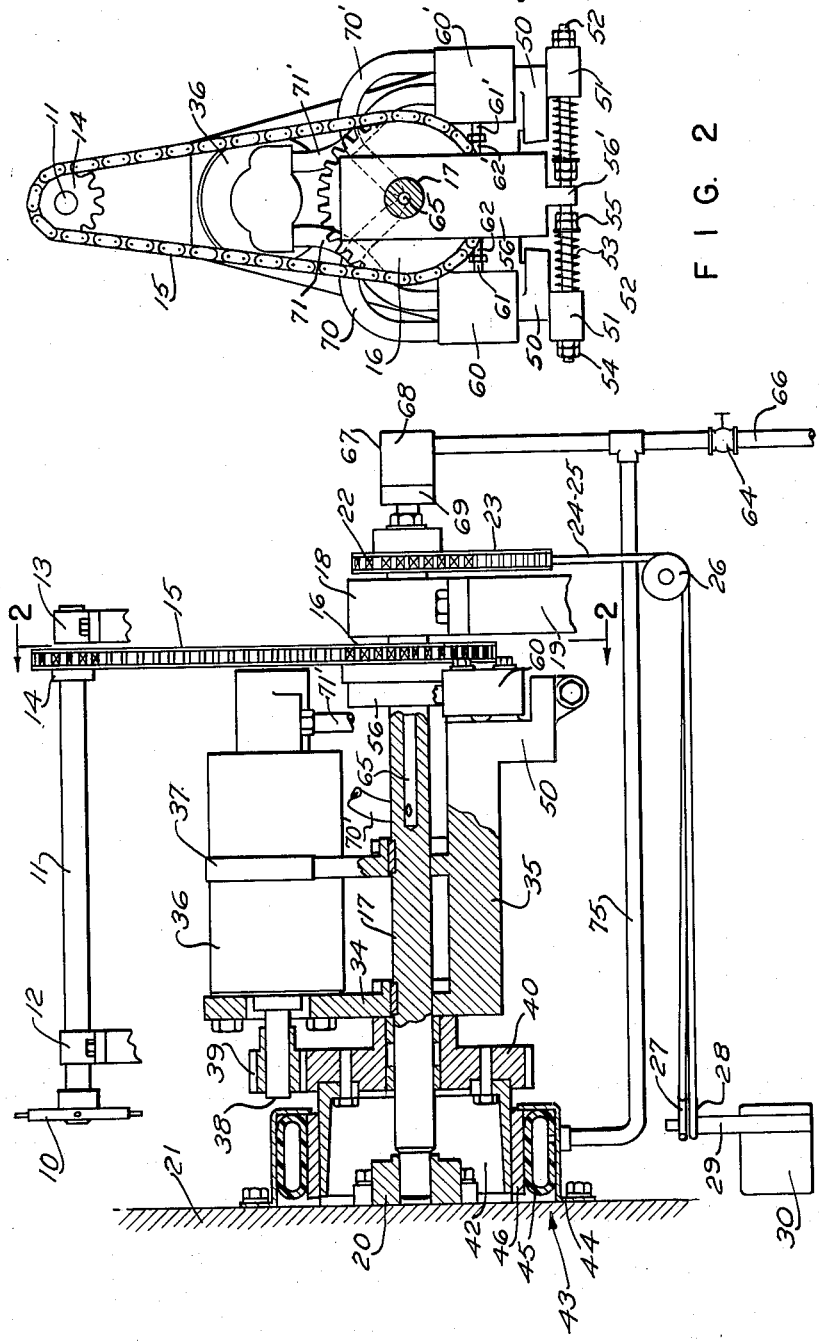

3,225,730
POWER ASSIST FOR VESSEL
STEERING MECHANISM
Luther H. Blount, Poppasquash Road, Bristol, R.I.
Filed Sept. 9, 1963, Ser. No. 307,596
4 Claims. (Cl. 114—144)

This invention relates to a steering mechanism for a vessel and more particularly to a means for applying power to assist the steering action.

One of the objects of this invention is to power the steering mechanism for a marine vessel, in such a way that should the power fail, the steering may be done by hand without making any shift or change of any parts.

Another object of this invention is to provide a power means which may be mounted upon the countershaft usually found in steering mechanisms.

Another object of the invention is to provide a power means which will be mechanically set into action by the rotation of the countershaft in its usual use in steering the vessel.

Another object of the invention is to provide a simple apparatus which may be positive in it action and yet will not interfere with the usual steering of the vessel.

With these and other objects in view, the invention consists of certain novel features of construction as will be more fully described and particularly pointed out in the appended claims.

In the accompanying drawings:

FIG. 1 is an elevational diagrammatic view partially in section and showing generally the apparatus which is included in this invention; and FIG. 2 is a sectional view of substantially line 2—2 of FIG. 1.

In proceeding with this invention, I have mounted an oppositely rotatable motor on the countershaft of a vessel's steering mechanism together with controls which are actuated by a relatively movable arm for causing the motor to turn its shaft in one direction or the other. A gear is also mounted on the shaft which is held against turning relative to the shaft so as to act as a sun gear with a pinion gear driven by the motor and engaging the sun gear when held so as to turn the motor and the shaft to which the motor is secured in order to cause the steering action.

With reference to the drawings, 10 designates the steering wheel of the vessel which may be manually turned to rotate the shaft 11 mounted in bearings 12 and 13 for rotation of a gear 14 which has chain 15 for driving gear 16 mounted for rotation on the countershaft 17. This countershaft 17 is mounted for rotation in bearings 18 suitably supported as at 19 and a bearing 20 which is mounted on bulkhead 21 of the vessel. Gear 22 mounted adjacent bearing 18 serves to manipulate chain 23 which is attached to cables 24 and 25 passing about suitable sheaves 26 to the quadrant 27 and 28 for operation of the rudder posts 29 and rudder 30.

A bracket 34, having a counterweight 35, is mounted upon countershaft 17 and is keyed thereto so as to rotate with the countershaft. This bracket mounts a motor 36 here shown as an air motor for illustration, which may rotate in either clockwise or counterclockwise direction depending upon the selective application of air applied thereto. A band 37 which is a part of the bracket also embraces the motor 36. This motor has a drive shaft 38 which mounts a pinion gear 39 which is rotatively driven by the motor.

A sun gear 40 is mounted for free rotation on countershaft 17 and carries a brake drum 42 bolted thereto. An air brake designated generally 43 extends about this brake drum and comprises a casing 44 bolted to bulkhead 21, an air doughnut 45 and a brake shoe 46 so that when air is supplied under sufficient pressure to the doughnut 45 the brake will be applied to hold the sun gear 40 affixed with relation to the bulkhead 21.

Bracket 34 carries spaced arms 50 each having bosses 51 for slidably mounting a plunger 52 which is spring pressed as at 53, the spring being adjustable by means of nuts 54 and 55 at either end thereof. These plungers 52 engage the reduced portion or finger 56' of an arm 56 which is fixed to gear 16 so as to move therewith, this gear being freely mounted upon countershaft 17 so that there is some lost motion as gear 16 is rotated until the arm presses in one of the plungers and in turn turns the shaft through the bracket arm 50 and bracket 34. This bracket 34 also carries air control valves 60 and 60' which have control plungers 61 and 61' to be engaged by adjustable pins 62 and 62' carried by arm 56 so as to actuate one or the other of these valves as the arm moves.

Countershaft 17 has a bore 65 extending axially thereof into which air is supplied from some source, not shown, by conduit 66 with control valve 64 through air seals 67, portion 68 being fixed while portion 69 turns with the shaft. Air is picked up from this bore 65 by tubes 70 and 70' and carried to the control valves 60 and 60'. Air is supplied from each of these control valves through the selected conduit 71 or 71' to the air motor 36 depending upon the rotation which is desired from this motor.

At the same time that air is supplied to the motor by actuation of either valve 61 or 61', air will be supplied by conduit 75 so as to apply the brake upon the brake drum 42 and hold the sun gear 40 against rotation since the air valve is always open when power is applied for steering.

It will thus be apparent that when steering wheel 10 is rotated in a direction to move arm 56 toward valve 60 or to the left as shown in FIG. 2, air will be supplied upon actuation of this valve 60 to the motor through conduit 71 to cause clockwise rotation of the motor shaft as shown in FIG. 2 and as at the same time the brake is applied and the gear 40 is held against rotation the pinion or planet gear 39 will rotate to turn the motor, bracket and shaft clockwise together with the countershaft 17 so as to turn the countershaft in a direction to apply rudder for steering the ship. As soon, however, as the steering wheel is turned in the other direction, the arm 56 will be swung so as to apply pressure upon the control 61' which will actuate valve 60' to supply air through conduit 71' to the motor to cause a rotation in the opposite direction, and thus the rudder will be turned in the opposite direction for this purpose.

In the event that the source of power which is air, in this instance, should fail, the motion of the steering wheel 10 through shaft 11 and chain 15 will be applied to gear 16 through arm 56 to the bracket which will in turn cause rotation of the countershaft so that steering will be done by hand. In this case, the brake drum will release gear 40 and this gear will turn so that no resistance from the motor being turned will be had, which is material where an air motor is used. Thus if there should be any failure in the power mechanism, failure is safe so that steering may be done by hand.

As above indicated when an air motor is used, it is desirable to provide a means by which the sun gear 40 may be freed of the shaft so that the turning of the countershaft 17 by hand will not cause the air motor to be operated backward and provide some resistance to steering. In some cases, however, motive power may be used such as for instance an electric motor which when not energized will not provide this resistance and accordingly it will then be possible to use the sun gear 40 fixed with reference to the bulkhead without the use of a brake and thus simplify the installation by eliminating the brake. However, it will, of course, be possible to use an electric motor in a similar manner to that which has been provided by applying some electric brake instead of an air brake.

I claim:

1. In a steering mechanism for a vessel having a rudder and a manual wheel, a shaft means to transmit motion of said shaft to a rudder, mechanical means to rotate said shaft comprising a motor fixed on said shaft, a sun gear co-axial with said shaft, a pinion gear driven by said motor and meshing with said sun gear, means to hold the sun gear fixed relative to said shaft, a power supply for said motor, and control means responsive to the rotation of said manual wheel to apply power to said motor to rotate said shaft.

2. In a steering mechanism for a vessel having a rudder and a manual wheel, a rotatable countershaft, a sun gear rotatably mounted on said shaft, power operated brake means to hold said sun gear fixed relative to said shaft, a motor fixed to said shaft to rotate therewith having a pinion to engage said sun gear, a source of power for said motor, said source operating said brake to hold said sun gear, controls for said motor fixed to said shaft, means to operate said controls by manipulation of said wheel to apply power to said shaft and means to transmit rotation of said shaft to said rudder.

3. In a steering mechanism as in claim 2 wherein said means to operate said controls comprises a means to positively rotate said shaft from said wheel.

4. In a steering mechanism for a vessel having a rudder and a manual wheel, a rotatable countershaft, a sun gear rotatably mounted on said shaft, power operated brake means to hold said sun gear fixed relative to said shaft, a bracket fixed on said shaft, an oppositely rotatable motor carried by said bracket having a pinion gear to engage said sun gear, a source of power for said motor, said source operating said brake to hold said sun gear, a control arm rotatably mounted on said shaft, a pair of power control units mounted on said bracket on opposite sides of the shaft, one in a position to be engaged by said arm by a movement in one direction, and the other to be engaged by the arm by a movement in the other direction for supplying power to said motor for actuation in one direction or the other, and means on said bracket to be positively engaged by said arm to rotate said shaft in either direction, and means to rotate said arm in response to movement of said wheel.

References Cited by the Examiner

UNITED STATES PATENTS 2,590,029   3/1952   Minorsky _____ 74—388 X

DON A. WAITE, *Primary Examiner.*